United States Patent
Nohata et al.

[19]

[11] Patent Number: 6,111,656
[45] Date of Patent: *Aug. 29, 2000

[54] IMAGE COMMUNICATING APPARATUS

[75] Inventors: Yukio Nohata, Yokohama; Toru Maeda, Mitaka; Makoto Kobayashi, Tama; Takaaki Hashimoto, Hiratsuka, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/845,400

[22] Filed: Apr. 25, 1997

Related U.S. Application Data

[63] Continuation of application No. 08/338,767, Nov. 10, 1994, abandoned.

[30] Foreign Application Priority Data

Nov. 30, 1993 [JP] Japan .................................. 5-299880

[51] Int. Cl.[7] .............................. H04N 1/21; H04N 1/40
[52] U.S. Cl. .......................... 358/1.2; 358/296; 358/445
[58] Field of Search .................................. 358/400, 401, 358/404, 442, 445, 449, 296, 448, 447, 468, 1.1, 1.2, 1.5, 1.6, 1.8, 1.9, 1.12, 1.15, 1.17, 1.18

[56] References Cited

U.S. PATENT DOCUMENTS

| | | | |
|---|---|---|---|
| 3,902,009 | 8/1975 | Perreault | 358/486 |
| 4,302,781 | 11/1981 | Ikeda et al. | 358/288 |
| 5,182,650 | 1/1993 | Inoue et al. | 358/296 |
| 5,355,151 | 10/1994 | Yoshida et al. | 347/61 |
| 5,381,169 | 1/1995 | Arai et al. | 347/33 |
| 5,428,459 | 6/1995 | Asai | 358/449 |
| 5,465,156 | 11/1995 | Arai | 358/442 |
| 5,721,581 | 2/1998 | Saito et al. | 347/249 |
| 5,731,882 | 3/1998 | Kawamura | 358/426 |
| 5,788,385 | 8/1998 | Inoue et al. | 400/279 |

FOREIGN PATENT DOCUMENTS

| | | |
|---|---|---|
| 0076948 | 4/1983 | European Pat. Off. . |
| 0294622 | 12/1988 | European Pat. Off. . |
| 0310432 | 4/1989 | European Pat. Off. . |
| 0443716 | 8/1991 | European Pat. Off. . |

OTHER PUBLICATIONS

Patent Abstracts of Japan, vol. 7, No. 166 (E–188) Jul. 21, 1983 & JP–A–58 071 767 (Nippon Denshin Denwa Kosha) Apr. 28, 1983.

Patent Abstracts of Japan, vol. 7, No. 27 (E–156) Feb. 3, 1983 & JP–A–57 183 173 (Tokyo Shibaura Denki KK).

*Primary Examiner*—Madeleine Nguyen
*Attorney, Agent, or Firm*—Fitzpatrick, Cella, Harper & Scinto

[57] ABSTRACT

A facsimile section receives and decodes data transmitted through a communication line, converts the received data into dot image data line by line, and further performs resolution conversion of the data using a resolution converter. The data subjected to the resolution conversion is transferred to a printer section through a Centronics interface. When data of an entire line is all white, a white-skip command is transferred for that line. The printer section performs horizontal/vertical conversion of the transferred dot image data and data corresponding to the transferred white-skip command using a horizontal/-vertical converter, the converted data being stored in a scan buffer. When the scan buffer is full of the data for one scan, a recording head is driven to record an image. In an image communicating apparatus comprising the facsimile section and the printer section, the load of the control unit of the facsimile section can be diminished, and the time required for the recording can be reduced, with the above arrangement.

23 Claims, 6 Drawing Sheets

IMAGE COMMUNICATING APPARATUS

This application is a continuation of application Ser. No. 08/338,767 filed Nov. 10, 1994, now abandoned.

BACKGROUND OF THE INVENTION

1. Field of the Invention

The present invention relates to an image communicating apparatus for recording an image on a recording material in accordance with received image data.

2. Description of the Related Art

Hitherto, serial printers, e.g., ink jet printers, for recording image data output from host computers or the like have been known. This type of printer is connected to a host computer through a universal interface such as a Centronics interface. Image data corresponding to one main scan of a recording head is transferred from the host computer to the printer, which stores the data in its buffer and then performs recording. Each time one main scan is completed, a sheet of paper is advanced (sub-scan) by an amount corresponding to the recording width of the recording head. By repeating the main scan and the sub-scan a sufficient times, an image of one page is recorded.

Recently, a facsimile equipment using the aforementioned serial printer as a recording unit has been proposed. In this type facsimile equipment, as with the above combination of a host computer and a printer, a facsimile section for controlling transmission/reception of image data is connected to a printer section through a universal interface such as a Centronics interface for transferring the received image data to the printer section.

In facsimile equipment, image data is usually handled on a line-by-line basis. To record the received image data by a serial printer, therefore, the received image data must be transported (horizontal/vertical conversion) into data in accordance with an array of recording elements of a recording head mounted on the printer.

When the received image data has a resolution different from that used in recording by the printer, it is also required to convert the resolution of the image data.

If both horizontal/vertical conversion and resolution conversion are carried out in the facsimile section, the load of a CPU in the facsimile section will be so increased as to cause an overload state when transmitting or receiving another image while data is being transferred to the printer section.

Also, the transfer of data from the facsimile section to the printer section takes substantial time because the data is transferred as live data for all lines through a Centronics interface.

SUMMARY OF THE INVENTION

In view of the state of the art described above, an object of the present invention is to provide an improved image communicating apparatus.

Another object of the present invention is to provide an image communicating apparatus by which the load of a facsimile section can be diminished.

Still another object of the present invention is to provide an image communicating apparatus by which the time required for recording received image data can be shortened.

According to one aspect of the present invention is provided an image communicating apparatus in which a first control means, for controlling a process for reception of image data, controls one of resolution converting means and image data array converting means, and a second control means, for controlling a recording process, controls the other.

Another aspect of the present invention is to provide an image communicating apparatus in which a first control means, for controlling a facsimile section, controls resolution converting means for performing resolution conversion of image data, and a second control means, for controlling a printer section, controls horizontal/vertical conversion means for performing horizontal/vertical conversion of image data.

Still another aspect of the present invention is to provide an image communicating apparatus in which particular dot image data are transferred in the form of a particular signal to recording means.

The above and other objects, features and advantages of the present invention will be more fully apparent from the following detailed description and the attached drawings.

DESCRIPTION OF THE PREFERRED EMBODIMENT

Figure 1:
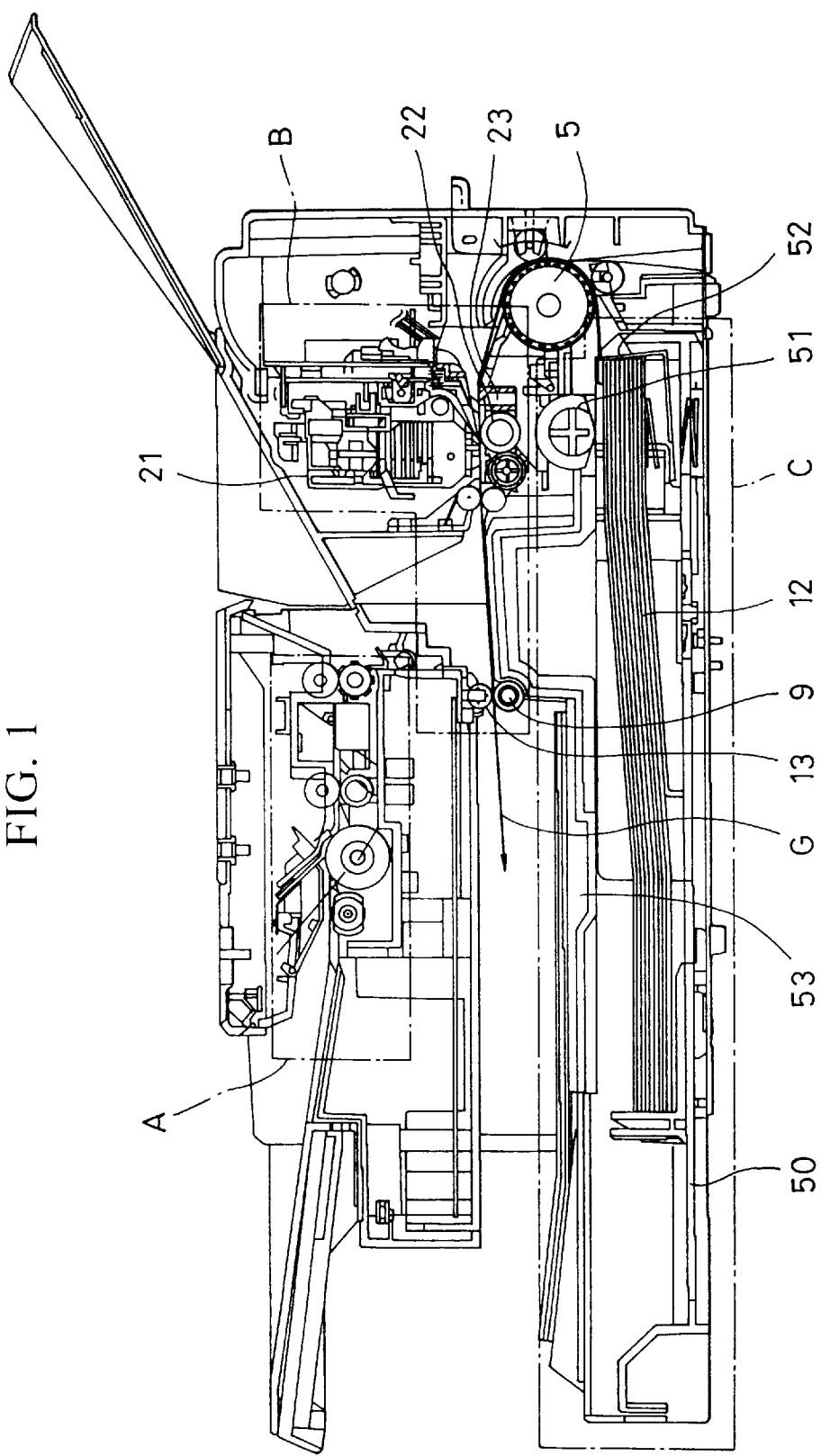
FIG. 1 is a schematic sectional view showing the construction of facsimile equipment to which the present invention is applied.

The preferred embodiment of the present invention will hereinafter be described in detail with reference to the drawings. Of the drawings, FIG. 1 is a schematic sectional view of facsimile equipment to which the present invention is applied. Referring to FIG. 1, reference letter A denotes a read unit for optically reading a document, B denotes a recording unit comprising an ink jet recording apparatus, and C denotes a recording paper cassette and a paper feed unit for separating a stack of recording paper in the form of cut sheets in the cassette one by one and supplying them to the recording unit.

The flow of the recording paper will first be briefly described with reference to FIG. 1. The feed path of the recording paper is indicated by a line headed by arrow G. Sheets of recording paper 12 stacked in a recording paper cassette 50 are picked up one by one by cooperation of a paper feed roller 51 and a separating finger 52. The picked-up sheet of recording paper is transported by a feed roller 5 and introduced to the recording unit B. In the recording unit B, a recording head 21 is reciprocally moved in a direction vertical to the drawing sheet to perform a main scan for recording. After the sheet of recording paper is transported through a certain distance in the equipment, it is led out by a paper discharge roller 9 and stacked in a discharged sheet stacker 53. A photosensor 13 is disposed on a shaft of the paper discharge roller 9 and serves to detect the depletion of ink in the recording head or a jam of the recording paper in the vicinity of the paper discharge roller by reading the density of a mark recorded at the sheet foot end.

Figure 2:
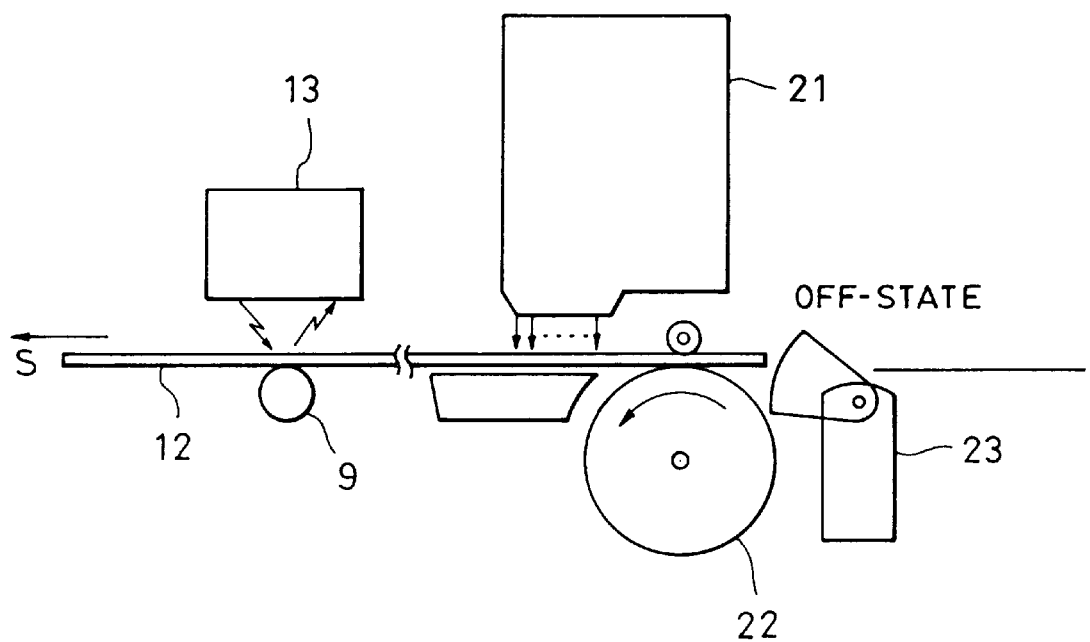
FIG. 2 is a view showing the construction of a recording section of the facsimile equipment shown in FIG. 1.

FIG. 2 schematically shows the construction of the recording unit B of the facsimile equipment shown in FIG. 1. Referring to FIG. 2, reference numeral 21 denotes a recording head which is an ink jet recording head of cartridge type having a built-in ink tank in this embodiment. The recording head itself can be replaced by a new one when ink is depleted.

The recording head 21 used in this embodiment is an ink jet recording head which has resolution of 360 dpi and includes a train of 64 nozzles in a direction of sub-scan (indicated by arrow S). An ink droplet is injected from an injection port at the distal end of each nozzle under pressure of film boiling occurred in the ink due to heating of an electro-thermal transducer disposed in the nozzle.

The recording head 21 is reciprocally moved by a carriage (not shown) in a direction perpendicular to the direction of feed of the recording paper 12 (i.e., to the direction of sub-scan), namely in the direction of main scan (i.e., the direction across the width of the drawing sheet), so that a recording scan is performed for each of going and returning strokes.

Denoted by 22 is a paper feed roller for transporting the sheet of recording paper to feed or discharge it and to determine the sheet position in the direction of sub-scan with accuracy of 360 dpi when recording is executed by the recording head 21. Denoted by 23 is a recording paper sensor which is brought into an on-state when the sheet of recording paper is present in a detecting portion of the recording paper sensor, and an off-state when no sheet is present there. The recording paper sensor 23 serves to detect the presence or absence of the sheet of recording paper and the front and rear edges of the sheet. Denoted by 13 is a reflection type photosensor for detecting the density of an image on the surface of the sheet of recording paper. In this embodiment, the photosensor 13 detects the density of an image in a predetermined pattern (black mark) recorded at the sheet foot end after recording an image of one page, thereby checking for depletion of the ink and for any failure in transport of the recording paper. The photosensor 13 comprises an LED and a phototransistor. The phototransistor is brought into an off-state for a portion where the black percentage is high, such as a portion where an image is recorded, because the amount of light reflected by the sheet and entering the LED is small, and an on-state for a portion where the reflective index is high, such as a portion where a ground color of the recording paper is exposed. Because the wavelength that is absorbed by the image depends on the ink materials, the LED as a light source is required to be selected taking into account those materials. In this embodiment, an LED emitting red light is employed since the ink used has a high absorptivity for wavelengths in the red region. Also, the photosensor 13 is disposed near a paper discharge port of the equipment in its mechanical layout, thus requiring to be kept in mind that the photosensor be located in a position free from an effect of extraneous light. The paper discharge roller 9 is made of such a material as rubber and, therefore, the photosensor 13 is brought into an off-state when the sheet of recording paper is not present over the paper discharge roller 9.

Figure 3:
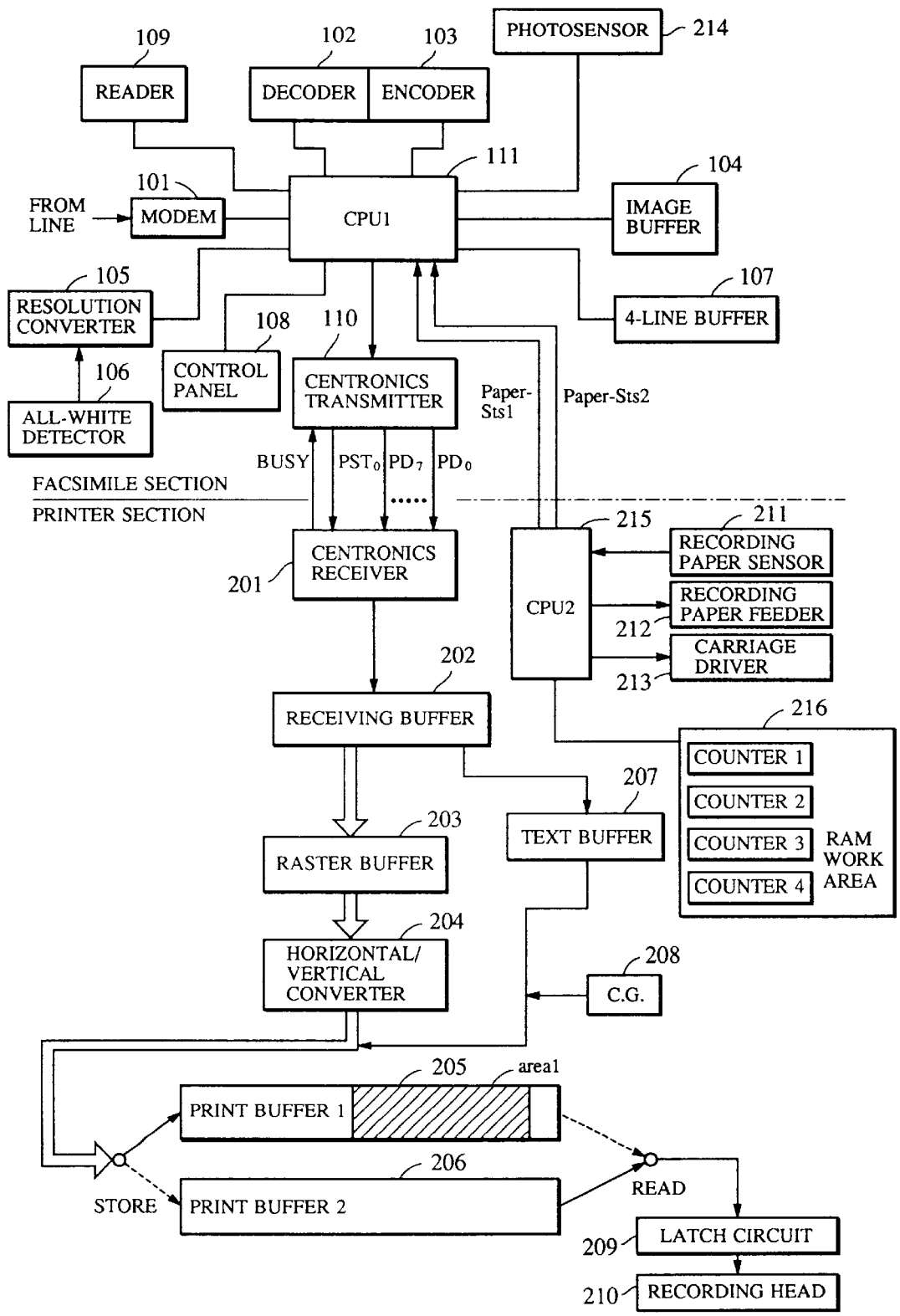
FIG. 3 is a block diagram of the electric configuration of the facsimile equipment shown in FIG. 1.

FIG. 3 is a block diagram showing the electric configuration of the facsimile equipment shown in FIGS. 1 and 2 with attention primarily focused on the flow of data. From the standpoint of the electrical configuration, the facsimile equipment comprises a facsimile section 100 and a printer section 200. Data is transferred from the facsimile section 100 to the printer section 200 through a Centronics interface. The facsimile section 100 will first be described. In FIG. 3, denoted by 101 is a modem for transmitting and receiving image data through a telephone line, 102 is a decoder for decoding the received data, 103 is an encoder for encoding the image data, 104 is an image buffer for accumulating the image data, 105 is a resolution converter for carrying out resolution conversion of the image data accumulated in the image buffer 104, 106 is an all-white detector for detecting that the data of one line is all white data, 107 is a 4-line buffer capable of storing the line data to be subject to and having been subject to the resolution conversion in the resolution converter 105 with a capacity corresponding to four lines. The capacity of the 4-line buffer 107 is allocated so as to store the data before resolution conversion in its storage area for two lines and the data after resolution conversion in its remaining storage area for the other two lines. 108 is a control panel provided with various function keys, indicators and so on, 109 is a reader for reading a document image when it is transmitted or copied, 110 is a Centronics transmitter for transmitting the line data stored in the 4-line buffer 107, and 111 is a control unit (CPU1) for controlling operation of the facsimile section 100.

The printer section 200 will now be described. Denoted by 201 is a Centronics receiver for receiving the data transmitted from the Centronics transmitter 110, 202 is a receiving buffer for temporarily storing the data received by the Centronics receiver 201, 203 is a raster buffer for decoding the data stored in the receiving buffer 202 through program processing and storing the decoded line data, 204 is a horizontal/vertical converter for converting the line data stored in the raster buffer 203 into vertical data, and 205, 206 are print buffers for storing the data output from the horizontal/vertical converter 204, each of the print buffers 205, 206 having a data storage capacity corresponding to the region over which recording is made by one main scan of the recording head.

Further, denoted by 207 is a text buffer for storing character code data output from the facsimile section 100 when a communication management report is issued, 208 is a character generator for converting the character code data stored in the text buffer 207 into a dot image and then outputting the dot image to the print buffer 205 or 206, 209 is a latch circuit for latching the data read out of the print buffer 205 or 206, and 210 is a recording head (corresponding to the recording head 21 in FIGS. 1 and 2) driven in accordance with the data latched in the latch circuit 209 for ejecting ink droplets.

In addition, denoted by 211 is a recording paper sensor (corresponding to the recording paper sensor 23 in FIGS. 1 and 2) for detecting the sheet of recording paper just before the recording position of the recording head, 212 is a recording paper feeder comprising a pulse motor or the like which generates driving forces for the feed rollers 5, 22, the paper discharge roller 9, etc., 213 is a carriage driver comprising a pulse motor or the like which generates driving forces for moving the carriage reciprocally with respect to the sheet of recording paper, 214 is a photosensor (corresponding to the photosensor 13 in FIGS. 1 and 2) for detecting the black mark recorded on the sheet of recording paper at its foot end, and 215 is a control unit (CPU2) for controlling a data transfer process in the printer section 200 and respective operations of the components therein.

The data transfer from the facsimile section 100 to the printer section 200 is executed through signal lines $PD_0$ to $PD_7$ between the Centronics transmitter 110 and the Centronics receiver 201 at a timing in synch with a pulse signal generated in a signal line $PST_0$. Note that the data transfer is enabled when a signal line BUSY is in an off-state. Signals Paper-Sts1, Paper-Sts2 corresponding to the position of the sheet of recording paper are output from the CPU2 in the printer section 200 to the CPU1 in the facsimile section 100. Based on these signals, the CPU1 determines the timing to detect the black mark by the photosensor 214. An output of the photosensor 214 is input to the CPU1 in the facsimile section 100.

The operation of the present facsimile equipment will now be described. The received data is demodulated by the modem 101 and is then decoded by the decoder 102 for development into dot image data, followed by check of communication errors. After that, the dot image data is encoded again by the encoder 103 and is stored in the image buffer 104. The encoded data stored in the image buffer 104 is read again sequentially and is then decoded through program processing in the CPU1 (111) for development into dot image data of one line, followed by storage into the 4-line buffer 107. The dot image data is sent to the resolution converter 105, and the converted data is stored in the remaining storage area of the 4-line buffer 107 for two lines. The all-white detector 106 is now operated to check whether the stored data of one line is all white data or not. In the case of all-white data, the detector 106 informs the CPU1 (111) of the fact that the stored data is all-white data. Then, the CPU1 gives the Centronics transmitter 110 a command indicating that the data of one line is all white data, and erases those data of one line in the 4-line buffer 107, enabling the 4-line buffer 107 to store the next data. Otherwise, the image data subject to the resolution conversion and stored in the 4-line buffer 107 is delivered directly in the form of dot image data.

When data of at least one line is stored in the 4-line buffer 107, the CPU1 checks the BUSY signal. If the BUSY signal is in an off-state, the image data subject to the resolution conversion and stored in the 4-line buffer 107 is delivered to the receiving buffer 202 through the Centronics transmitter 110 and the Centronics receiver 201. The BUSY signal assumes an off-state if there is a vacancy in the receiving buffer 202. Accordingly, the data transfer from the 4-line buffer 107 to the receiving buffer 202 is executed if there is a vacancy in the receiving buffer 202. Also, the data transfer from the image buffer 104 to the 4-line buffer 107 is executed if the 4-line buffer 107 has a vacancy corresponding to at least one line.

Note that because the resolution of the received data is different from the resolution (360 dpi×360 dpi) of a recorded image, the resolution conversion is effected to make the resolution of the image data match that for recording.

The flow of data in the printer section 200 will now be described. As described above, the data transmitted from the facsimile section 100 through the Centronics interface is temporarily stored in the receiving buffer 202, comprising a RAM. The data stored in the receiving buffer 202 is separated into dot image data of one line converted into the desired resolution (360 dpi) by the resolution converter 105, and a command. The CPU2 (215) checks the content of the data in the receiving buffer 202. If the stored data is image data, the image data is read out of the receiving buffer 202 and transferred to the raster buffer 203. If the stored data is a command, the CPU2 interprets the content of the command. If the command is a white-skip command indicating that the data of one line is all white, no data is stored in the corresponding storage area of the raster buffer 203, and the next image data is stored in the next storage area.

The raster buffer 203 is a memory having a capacity (8×3640 bits) corresponding to eight lines. When data of eight lines is stored in the raster buffer 203, the data is sequentially sent to the horizontal/vertical converter 204 starting from one at the left-hand end of the raster buffer 203 for horizontal/vertical conversion. The converted data is transferred to one of the print buffer 1 (205) and the print buffer 2 (206). The print buffers 205, 206 are each a memory having a storage capacity (64×3640 bits) corresponding to the amount of data that is recorded by the recording head 21 per scan. While one of the print buffers is used for reading data (i.e., recording), the other is used for storing data to be read out in the next main scan.

The CPU2 counts the number of times that the data of eight lines is subject to the horizontal/vertical conversion. When the counted value reaches eight, i.e., when the horizontal/vertical conversion of the data of 64 lines is completed, the CPU2 outputs a printing start signal on judgment that the data for one main scan has been prepared, to start moving the carriage so that recording operation is started in accordance with the data stored in the print buffer 1 (205) or the print buffer 2 (206). The data is sent to the latch circuit 209 in units of 64 dots, and ink ejection heaters of the recording head 210 are driven depending on the data latched in the latch circuit 209. In parallel, the data to be read out in the next main scan is stored in the other print buffer.

The CPU2 detects before the start of a main scan the first and last addresses in the line at which black data is stored in the print buffer, and when the data up to the final address has been transferred, it ceases the scan and switches over the print buffers such that the print buffer previously used for storing the data is now allocated to recording and the print buffer previously used for recording is now allocated to store the data.

A description will now be given of actual recording operation and the timing to transfer data from the receiving buffer 202 to the print buffer 205 or 206. First, the image data is transferred from the facsimile section 100 and is stored in the receiving buffer 202. A RAM 216 has a counter 1 set up in its work area for counting the number of lines stored in the raster buffer 203. The CPU2 increments the counter by 1 each time the data of one line is stored in the raster buffer 203, and then determines whether the counted value of the counter 1 has reached eight or not. Until the counted value of the counter 1 reaches eight, the data transfer from the receiving buffer 202 to the raster buffer 203 is continued. When the counted value of the counter 1 reaches eight, the data transfer from the receiving buffer 202 to the raster buffer 203 is suspended, and the data in the raster buffer 203 is sequentially subjected to the horizontal/vertical conversion starting from one at the left-hand end of the buffer, the converted data being then stored in the print buffer 1 (205). The RAM 216 also has a counter 2 set up in its work area for counting the number of times that the horizontal/vertical conversion is executed. The CPU2 increments the counter by 2 each time data of eight lines is subject to the horizontal/vertical conversion, and then determines whether the counted value of the counter 2 has reached eight or not. Until the counted value of the counter 2 reaches eight, the data transfer for eight lines from the receiving buffer 202 to the raster buffer 203 and the data transfer from the raster buffer 203 to the print buffer 1 (205) are repeatedly executed. Since the counter 2 is required only to count the value up to eight at maximum, this arrangement is much simpler than would be the case with counting the number of data (64× 3640) for one main scan.

When the counted value of the counter 1 reaches eight, the CPU2 issues a recording start signal to record the data for the first scan stored in the print buffer 1. Prior to the start of recording, the CPU2 detects how wide and from which address black data is present in the data stored in the print buffer 1 (205) (see area 1 in that buffer in FIG. 3), and stores the final address in a predetermined area of the RAM 216. The addresses in each of the print buffers 205, 206 are in one-to-one relationship with respect to respective positions in a region scanned by the recording head 210. The position of the recording head 210 is determined from the counted value of a counter 4 in the RAM 216, which counts the number of pulses supplied to a carriage driving pulse motor in the carriage driver 213, with its home position (not shown) as a reference. More specifically, when the recording head is moved in a direction away from the home position, the counted value of the counter 4 for counting the number of pulses supplied to the carriage driving pulse motor is incremented, and when the recording head is returned in a direction toward the home position, the counted value of the counter 4 is decremented, whenever a pulse is supplied to the carriage driving pulse motor. The counter 4 is also set up in a predetermined area of the RAM 216. Based on the counted value of the counter 4, the current position of the recording head 210 can be detected.

Upon the recording start signal being issued, the recording head 210 starts moving from the home position. When it is detected that the recording head 210 reaches such a position as corresponding to the first column position where black data is present, the data stored in the print buffer 1 is read out in units of 64 dots sequentially from that position and is latched in the latch circuit 209. In accordance with the latched data, ink injection heaters of the recording head 210 are driven depending on the latched data to perform recording of the first scan. The RAM 216 further has a counter 3 set up in a predetermined area, for setting the number of columns corresponding to the width of black data.

The data is read out starting from the first column position where black data is present, and the counter 3 is decremented each time recording is performed. This counting operation of the counter 3 also progresses by counting a pulse signal corresponding to the pulse supplied to the carriage driving pulse motor. When the counted value of the counter 3 becomes zero, the recording head is stopped there, upon judgment that the first scan is ended. Upon the end of the first scan, the recording paper feeder 212 is driven to advance the sheet of recording paper (sub-scan) through a distance corresponding to the recording width of the recording head 210.

While the data for the first scan is being recorded, the data for the second scan is transferred from the receiving buffer 202 to the print buffer 2 (206) and is stored in the latter in a like manner to the data transfer for the first scan. If the data for the second scan is completely stored in the print buffer 2 (206) prior to the end of the first scan, the print buffers are switched over at the end of the first scan such that the print buffer 1 (205) is allocated to read data and the print buffer 2 (206) is allocated to store data. Then, the data is read out of the print buffer 2 (206) to perform recording by the second scan as with the first scan, while the data for the third scan is stored in the print buffer 1 (205).

If the data for the second scan is not yet stored in the print buffer 2 (206) at the end of the first scan, the recording head 210 remains on standby in the position where the printing by the first scan has been ended, until the data for the second scan is completely stored in the print buffer 2. If a predetermined period of time (e.g., 2 seconds) elapses in the standby state, the recording head 210 is returned to the home position. When the data for the second scan is completely prepared, the print buffers are switched over such that the print buffer 2 (206) is allocated to read data and the print buffer 1 (205) is allocated to store data. Then, the data is read out of the print buffer 2 (206) to perform recording by the second scan. During the recording by the second scan, the data for the third scan is stored in the print buffer 1 (205). Upon the end of the second scan, the sheet of recording paper is advanced through a distance corresponding to the recording width of the recording head 210.

In this way, an image of one page is recorded by repeating the above process subsequent to the third scan successively, while switching over the print buffers such that the print buffers 205, 206 are alternately allocated to read (record) data and to store data.

In the facsimile equipment of this embodiment, as described above, the width and starting address of an area in which black data is present in the data stored in the print buffer 1 (205) or 2 (206), is detected beforehand and stored in the RAM.

Then, when starting the next main scan after the end of the current main scan, the end position of recording by the current scan and the range over which black data subject to the next scan is present are both referred to select one of opposite ends of the black data range which gives a shorter distance for movement of the carriage from the end position of recording by the current scan, as a printing start position for the next main scan. Accordingly, high-speed printing can be realized without useless movement of the carriage.

In the case where the data includes a line, e.g., a ruled line, extending over two successive main scans, if the printing direction were reversed between the two main scans, there would occur an offset between ruled lines recorded by the opposite scans. Therefore, the printing operation is controlled so as to record the data in the same direction regardless of the end position of recording by the current scan and the printing range covered by the next scan.

When the communication is ended, or when the user sets an instruction from the control panel 108 to issue a communication management report, the CPU1 transmits communication management information in the form of character data to the printer section 200 through the Centronics interface. In this case, the image buffer 104 and the 4-line buffer 107 are not used, unlike the above case of recording the received data. In the printer section 200, the received character data is stored in the receiving buffer 202. The data stored in the receiving buffer 202 is read out successively, analyzed and then stored in the text buffer 207. The character data stored in the text buffer 207 is developed by the character generator 208 into a dot image which is stored in the print buffer 1 (205) or 2 (206).

The subsequent recording operation is the same as in recording the received image.

Figure 4:
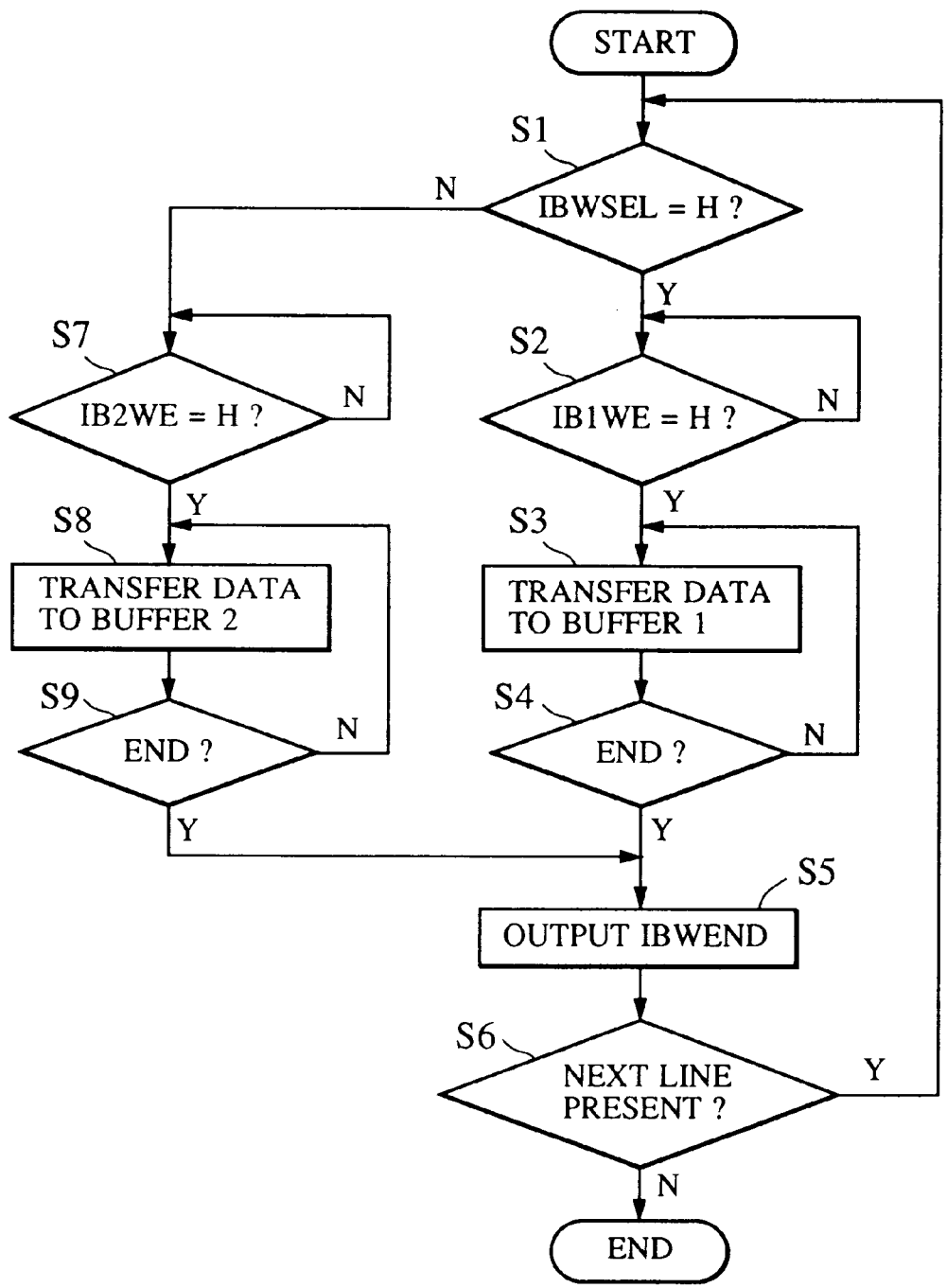
FIG. 4 is a flowchart for a process of transferring data to a Centronics transmitter.
Figure 5:
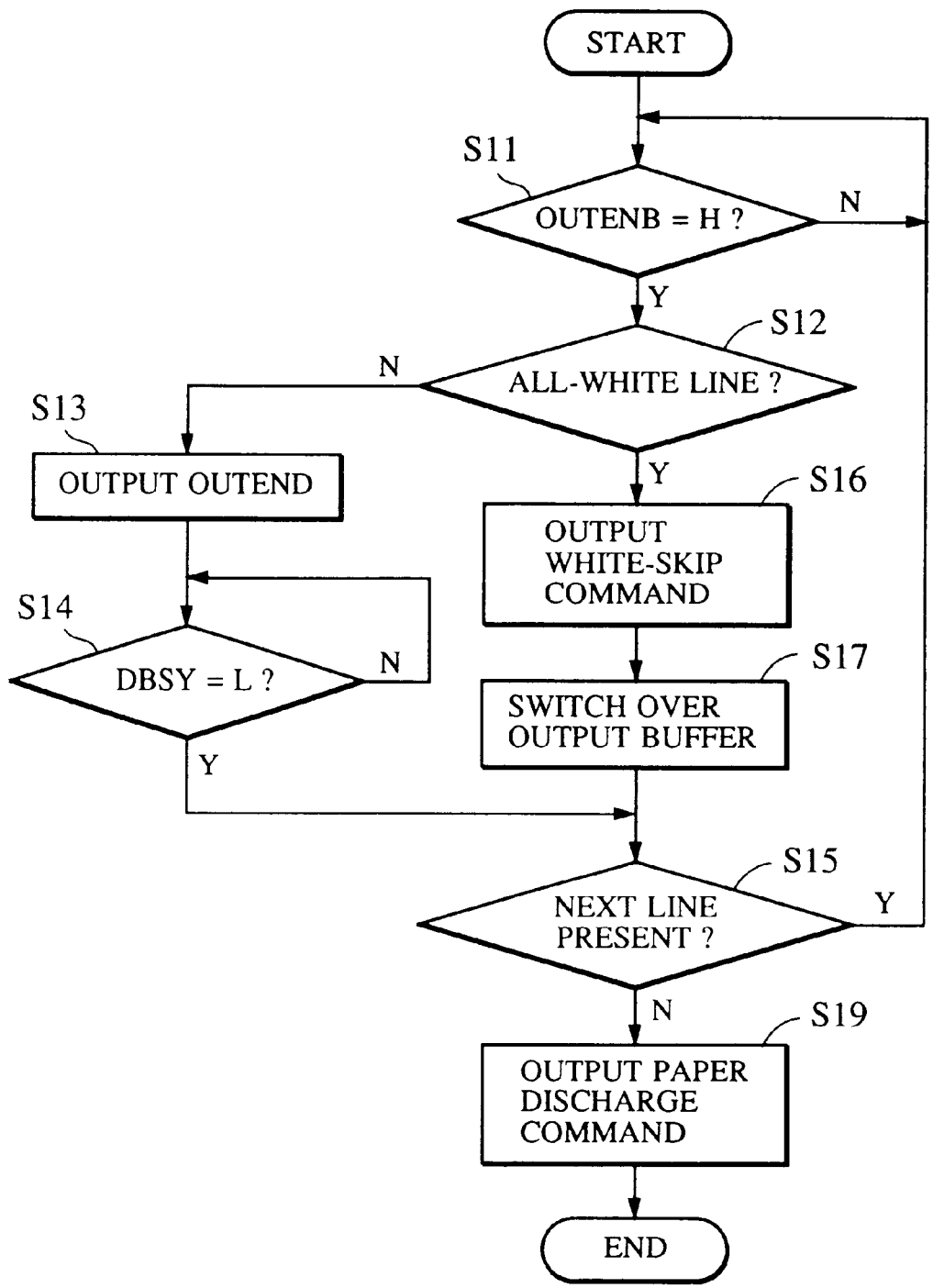
FIG. 5 is a flowchart for a process of transferring data from the Centronics transmitter to a Centronics receiver.
Figure 6:
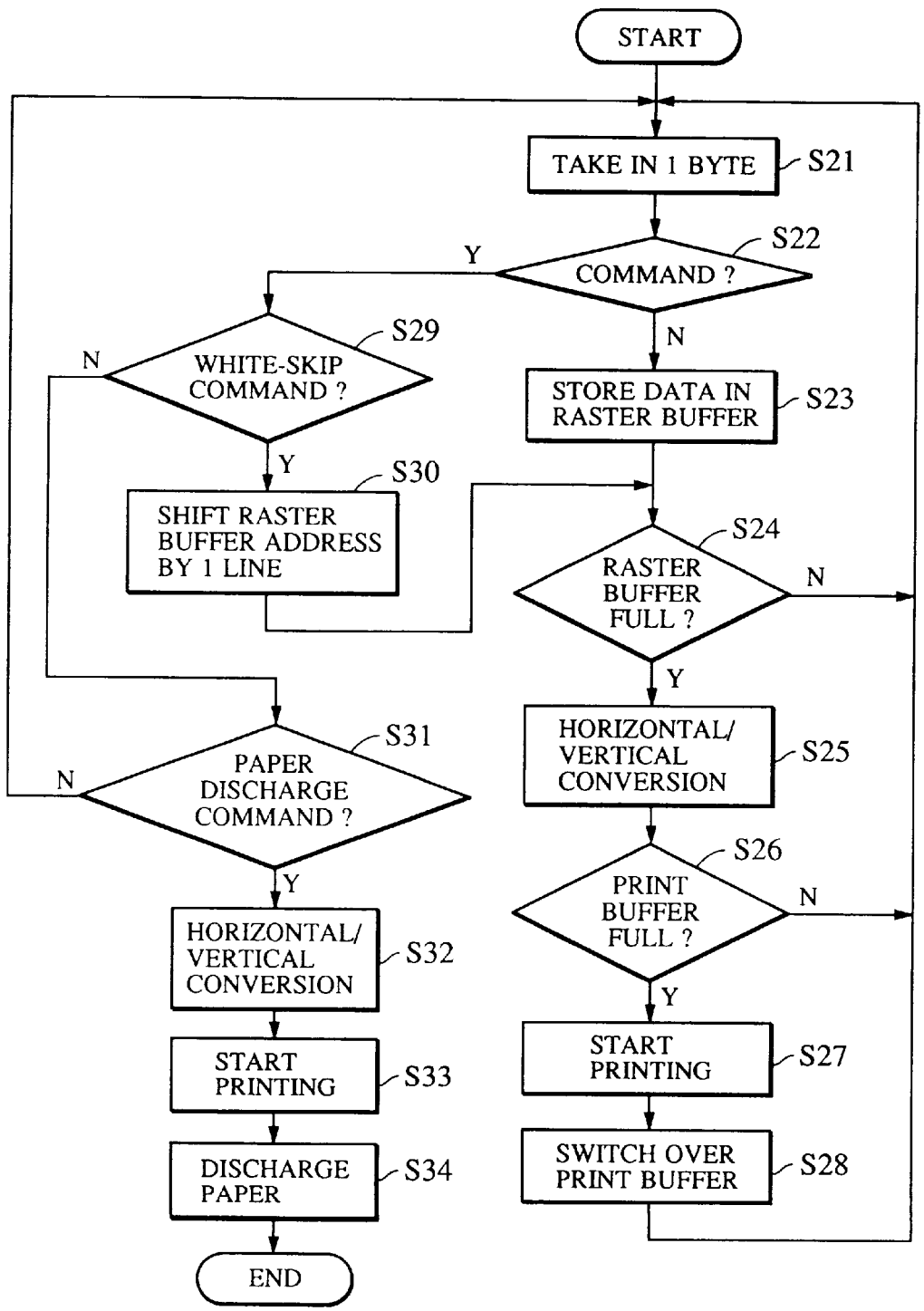
FIG. 6 is a flowchart for data processing in a printer section.

FIGS. 4 to 6 are flowcharts for a control process executed by the CPU1, 2 to achieve the foregoing operation. The control process will be described below in detail.

FIG. 4 is a flowchart for a process in which the CPU1 transfers image data to the Centronics transmitter 110 in the block diagram shown in FIG. 3.

First, in step S1, it is checked which one of two input buffers in the Centronics transmitter 110 the image data should be transferred to. If IBWSEL is at an H level, this indicates that the image data is now transferred to the input buffer 1. Therefore, it is checked in step S2 whether the input buffer 1 is in an image data write enable state or not. If enabled, the image data is transferred to the input buffer 1 in step S3. If the end of transfer of the image data is confirmed in step S4, the process goes to step S5, where the CPU1 outputs IBWEND to the Centronics transmitter 110 for informing the Centronics transmitter 110 of that the transfer of the image data has been ended. At this point, the Centronics transmitter 110 starts to transfer the image data in the input buffer 1 to an output buffer 1 in the Centronics transmitter 110. In this respect, the image data stored in the input buffer 1 is always transferred to the output buffer 1 and the image data stored in an input buffer 2 is always transferred to an output buffer 2, respectively. Also, upon IBWEND being output in step S5, IBWSEL in step S1 is turned to an L level to switch over the input buffers for transfer of the data of next line. If the image data of next line is present in step S6, the process returns to step S1, followed by going to step S7 as IBWSEL is now at L. It is then checked in step S7, whether the input buffer 2 is in an image data write enable state or not. If enabled, the process goes to step S8, where the image data is transferred to the input buffer 2. If the end of transfer of the image data is confirmed in step S9, the process goes to step S5, where the CPU1 outputs IBWEND to switch over the input buffers, followed by going to step S6, as with the above-described case.

FIG. 5 is a flowchart for a process of transferring image data from the output buffer 1, 2 of the Centronics transmitter 110 to the Centronics receiver 201 of the printer section in FIG. 3.

In FIG. 5, it is first checked in step S11 whether OUTENB, indicating the status of the Centronics transmitter 110, is at H or not. OUTENB assumes H when the buffer from which image data is next output is in an enable state and the image data is not being output. If OUTENB is at H, the process goes to step S12 to check whether the image data to be next output is determined by the all-white detector 106 to be all white or not. If the image data to be next output is not all white, the process goes to step S13, where OUTEND is output to the Centronics transmitter 110 for starting transfer of the image data in the output buffer of the Centronics transmitter 110 to the printer section. After starting the data transfer, the CPU1 waits for the end of the data transfer in step S14. The status DBSY determined in step S14 assumes H during the data transfer. If DBSY is turned to L, this means that the transfer of the image data is ended. Then, the process goes to step S15 to check whether the image data of next line is present or not.

If the image data to be next output is determined to be all white in above step S12, the process goes to step S16 where a white-skip command is output to the printer section instead of transferring the image data. Then, in step S17, the output buffers are switched over immediately since the all-white image data is not required to be output. The image data remaining in the output buffer without being output is erased at the time the image data is transferred from the input buffer to that output buffer. After that, the process goes to step S15 to check whether the image data of next line is present or not. If the image data of next line is not present, a paper discharge command is output to the printer section in step S19, thereby ending the process.

FIG. 6 is a flowchart for processing of the data transferred from the Centronics transmitter 110, which processing is executed by the CPU2 in FIG. 3. It is here assumed that feeding and initial positioning of the sheet of recording paper to the recording position have been finished normally.

First, the CPU2 takes in one byte of data from the receiving buffer 202 in step S21. It is then determined in step S22 whether the taken-in data is a command or a part of the image data. If the taken-in data is image data, the process goes to step S23, where the image data is stored in the raster buffer 203 at the next available address. As described above, the raster buffer 203 is a memory having a capacity corresponding to eight lines. It is then checked in step S24 whether the raster buffer 203 is full of image data of eight lines or not. If image data of eight lines is not yet stored in the raster buffer 203, the process returns to step S21 to take in the next data. If image data of eight lines is stored in step S24, the process goes to step S25 for horizontal/vertical conversion of the data of eight lines, the converted data being stored in the print buffer 1 or 2 which has a capacity corresponding to one main scan of the recording head 210. Then, the process goes to step S26 to check if the print buffer 1 or 2 is full of the image data for one main scan of the recording head 210. If so, the process goes to step S26 to start the printing operation. After that, the print buffers are switched over in step S28 such that the print buffer so far used to store data is allocated to the printing operation, and the print buffer so far used for the printing operation is allocated to store data. If the print buffer is not full of the image data for one main scan of the recording head 210 in step S26, the process returns to step S21 to take in data again.

If the taken-in data is determined to be a command in above step S22, the process goes to step S29 to check whether the data is a white-skip command or not. If the data is a white-skip command, the address of the raster buffer 203 at which the image data is to be stored is advanced by a value corresponding to one line. The process then goes to step S24 to check whether the raster buffer 203 is full of the image data of eight lines or not.

If the data is not a white-skip command in above step S29, the process goes to step S31 to check whether the data is a paper discharge command or not. If the data is a paper discharge command, this means that the transfer of the image data of one page has been ended. Then, the process goes to step S32 where the image data remaining in the raster buffer 203 is subject to the horizontal/vertical conversion and the converted data is stored in the print buffer, followed by starting to print the image data in the print buffer. After the end of the printing, the sheet of recording paper is discharged in step S34, thereby completing the recording operation for one page.

As will be apparent from the above description, the following advantages are provided by this embodiment.

(1) Since the resolution conversion and the horizontal/vertical (line/column) conversion are distributively carried out in the facsimile section and the printer section, the load of the facsimile section can be so diminished as to prevent an overload even when another image is transmitted or received through a telephone line during the image transfer to the printer section.

(2) Since the image data is transferred between the Centronics transmitter and the Centronics receiver partly in the form of a command, the transfer time can be shortened.

(3) Since print buffers for multiple scans are arranged in the process of recording images, the printing speed is increased and address management of the print buffers is facilitated.

(4) Since bidirectional printing is made for the normal image data and the particular image data, such as a ruled line extending over two main scans, is printed in the same direction, high-quality recording free from an offset of ruled lines can be achieved while speeding up the printing.

(5) By designing the printer section to perform either one of the resolution conversion and the horizontal/vertical conversion so that the capacity of each buffer and the timing of transfer between the buffers are set to be optimum, a facsimile apparatus can be provided which is capable of high-speed recording at the reduced cost.

The above embodiment has been described in connection with, particularly, an ink jet recording printer of the type in which thermal energy is utilized to form flying liquid droplets for recording.

The typical arrangement and principle of the above type printer is preferably in accordance with the basic principle disclosed in, for example, U.S. Pat. Nos. 4,723,129 and 4,740,796. The disclosed principle is applicable to any of the so-called on-demand and continuous type systems. The principle is, however, particularly effective for the on-demand type system in which a sheet or a liquid path for holding a liquid (ink) is provided with an electro-thermal transducer, and at least one drive signal which corresponds to recording information and is enough to cause a rapid temperature increase beyond the state of core boiling is applied to the electro-thermal transducer, thereby producing thermal energy in the electro-thermal transducer to bring about film boiling at the heat acting surface of the recording head, so that air bubbles in one-to-one relationship with respect to the drive signals may eventually be formed in the liquid (ink). In accordance with growth and contraction of the air bubble, the liquid (ink) is injected through an injection port to form at least one droplet. Due to the application of the drive signal in the form of a pulse, the air bubble is grown and contracted promptly and appropriately. This is particularly preferable in achieving ejection of the liquid (ink) with excellent response.

The drive signal in the form of a pulse can suitably be that disclosed in U.S. Pat. Nos. 4,463,359 and 4,345,262. Additionally, by employing the conditions described in U.S. Pat. No. 4,313,124 which sets forth the invention relating to a temperature increase rate of the aforementioned heat acting surface, more superior recording can be achieved.

The recording head can be constructed by employing the combination (linear or right-angled liquid flow path) of the injection port, the liquid path, and the electro-thermal transducer disclosed in the above-cited U.S. Patents. Alternatively, the recording head may be of the construction in which the heat acting portion is disposed in a bent region, as disclosed in U.S. Pat. Nos. 4,558,333 and 4,459,600.

In addition, the recording head may be constructed such that a common slit is used as an ejection portion for a plurality of electro-thermal transducers as disclosed in Japanese Patent Laid-Open No. 59-123570, or such that an aperture for absorbing pressure waves of thermal energy is formed corresponding to the ejection portion as disclosed in Japanese Patent Laid-Open No. 59-138461.

The present invention is also applicable to the case of employing a replaceable recording head of chip type that can be electrically connected to the apparatus body and supplied with ink therefrom when mounted to the apparatus body, or the case of employing a recording head of cartridge type that includes an ink tank provided in a unitary structure with the recording head itself.

Moreover, it is preferable to additionally provide restoring means, preliminary auxiliary means, etc. on the recording head from the standpoint of further stabilizing the advantageous effect of the present invention. Examples of those means include capping means, cleaning means, and pressing or sucking means for the recording head, and preliminary heating means comprising an electro-thermal transducer, a heating element different from the electro-thermal transducer, or a combination of both the members. A preliminary injection mode to eject ink separately from the recording is also effective to achieve the stable recording.

A recording mode of the recorder is not limited to one in which data is recorded in only a primary color, e.g., black. By constructing the printing head as a unitary structure or a combination of plurality of members, the recorder may have at least one of a multicolor mode providing a print in independent colors, or a full-color mode providing a print in mixed colors.

While the ink has been described as a liquid in the above embodiment of the present invention, the ink may be solidified at temperatures lower than the room temperature, but softened or liquefied at the room temperature. Also, since it is general in the above-described ink jet recording system to adjust the temperature of the ink itself to fall in the range of 30° C. to 70° C. for keeping viscosity of the ink in the state to ensure stable ejection, any kind of ink may be used so long as the ink is in the liquid phase when a recording signal is applied thereto.

As an alternative, there can be employed an ink that is positively prevented from increasing in temperature due to thermal energy by utilizing the thermal energy to change the ink from the solid phase to the liquid phase, or an ink that is solidified when left to stand in non-use, to prevent evaporation of the ink. In other words, the ink may have the property that it is first liquefied under thermal energy, such as represented by an ink that is liquefied upon application of thermal energy produced with a recording signal and is injected as liquid ink, or an ink that starts solidifying at the time it reaches a recording medium. In any of the above cases, the ink may be held as a liquid or solid in a recess or throughhole defined by a porous sheet in opposite relation to an electro-thermal transducer, as disclosed in Japanese Patent Laid-Open No. 54-56847 or No. 60-71260. In the present invention, the above-described film boiling method is most effective to any kinds of ink cited above.

Furthermore, the recorder of the present invention may be practiced in various forms, besides a facsimile equipment as in the illustrated embodiment, such as an image output terminal of information processors, e.g., word processors and computers, in a unitary or separate structure, and a copying machine combined with a reader or the like.

Additionally, the present invention is not limited to the type ejecting ink droplets with thermal energy, but may be applied to the type ejecting ink droplets by using piezoelectric devices or the like.

As described hereinabove, the present invention provides the following advantages. According to one aspect of the invention, since a first control means, for controlling a facsimile section, controls resolution converting means, and a second control means, for controlling a printer section, controls horizontal/vertical conversion means, the load of the first control means can be so diminished that transmission or reception of image data and recording operation thereof can be performed in parallel without increasing the time required for the recording.

According to another aspect of the invention, since a first control means, for controlling a reception process, controls one of resolution converting means and image data array converting means, and a second control means, for controlling a recording process, controls the other, the load of the first control means can be so diminished that receiving operation and recording operation can be performed in parallel without increasing the time required for the recording.

According to still another aspect of the invention, since particular dot image data corresponding to the received image data are transferred in the form of a particular signal, the data transfer time in the apparatus can be shortened and, as a result, the time required for the recording can be reduced.

Finally, according to still another aspect of the invention, since a first control means, for controlling a facsimile section, controls resolution converting means, and a second control means, for controlling a printer section, controls horizontal/vertical conversion means, the load of the first control means can be so diminished. Further, since the printer section decodes data transferred from the facsimile section and then records the decoded data, the data transfer time from the facsimile section to the printer section can be shortened and, as a result, the time required for the recording can be reduced.

What is claimed is:

1. An image communicating apparatus comprising a facsimile section, a printer section, and interface means for connecting said facsimile section to said printer section, wherein:

said facsimile section comprises first reception means for receiving image data, storage means for storing the image data received by said first reception means, resolution converting means for converting a resolution of the image data stored in said storage means, means for transferring the image data converted by said resolution converting means to said interface means in a line-by-line format, and first control means for controlling operation of said facsimile section, and said printer section comprises second reception means for receiving the data transferred from said interface means in a line-by-line format, horizontal/vertical conversion means for performing horizontal/vertical conversion of the image data received by said second reception means, recording means for recording an image on a recording material in accordance with the data subjected to the horizontal/vertical conversion by said horizontal/vertical conversion means, and second control means for controlling operation of said printer section.

2. An image communicating apparatus according to claim 1, wherein said facsimile section includes detection means for detecting that a predetermined amount of data subject to the resolution conversion by said resolution converting means is all predetermined data, and said transfer means transfers the predetermined amount of data, which has been detected by said detection means to be all predetermined data, in the form of a command and the other data in the form of dot image data.

3. An image communicating apparatus according to claim 2, wherein said predetermined data is white data.

4. An image communicating apparatus according to claim 2, wherein said predetermined amount of data is data of one line.

5. An image communicating apparatus according to any one of claims 1 to 4, wherein said recording means records an image by ejecting ink droplets.

6. An image communicating apparatus according to claim 5, wherein said recording means ejects the ink droplets by causing a phase change of ink with thermal energy.

7. An image communicating apparatus comprising:

resolution converting means for converting a resolution of image data;

array converting means for converting an array of image data;

recording means driven in accordance with the image data obtained by said resolution conversion and said array conversion to record an image on a recording material;

first control means for controlling a reception process, in which image data is received and for controlling either said resolution converting means or said array converting means; and second control means for controlling a recording process, in which image data is recorded, and for controlling whichever of said resolution converting means and said array converting means is not controlled by said first control means.

8. An image communicating apparatus according to claim 7, wherein said first control means controls said resolution converting means and said second control means controls said array converting means.

9. An image communicating apparatus according to claim 7, wherein said array converting converts data in a line direction into data in a column direction.

10. An image communicating apparatus according to any one of claims 7 to 9, wherein said recording means records an image by ejecting ink droplets.

11. An image communicating apparatus according to claim 10, wherein said recording means ejects the ink droplets by causing a phase change of ink with thermal energy.

12. An image communicating apparatus comprising a facsimile section, a printer section, and interface means for connecting said facsimile section to said printer section, wherein:

said facsimile section comprises first reception means for receiving image data, storage means for storing the image data received by said first reception means, resolution converting means for converting a resolution of the image data stored in said storage means, first buffer means for temporarily accumulating the image data subject to the resolution conversion by said resolution converting means before transferring the converted image data to said interface means, transfer means for transferring the data in said first buffer means to said interface means in a line-by-line format, and first control means for controlling operation of said facsimile section, and said printer section comprises second reception means for receiving the data transferred from said interface means in a line-by-line format, second buffer means for temporarily accumulating the data transferred from said facsimile section, check means for checking the data in said second buffer means, and third buffer means for temporarily accumulating the data checked by said check means, horizontal/vertical conversion means for performing horizontal/vertical conversion of the data in said third buffer means, and fourth buffer means for temporarily accumulating the data subject to the horizontal/vertical conversion by said horizontal/vertical conversion means, recording means for recording the data in said fourth buffer means, and second control means for controlling operation of said printer section.

13. An image communicating apparatus according to claim 12, wherein said first buffer means further includes first detection means capable of accumulating data of at least one line and detecting whether the data of one line subject to the horizontal/vertical conversion by said horizontal/vertical conversion means is all in one color or not.

14. An image communicating apparatus according to claim 12, wherein, when said first detection means detects that the data of one line is all in one color, said transfer means does not transfer the image data in said first buffer means to said printer section, but issues to said printer section a signal indicating that the data of one line is all in one color.

15. An image communicating apparatus according to claim 12 or 13, wherein, when said first detection means detects that the data of one line is all in one color, said first control means erases the data of one line in said first buffer means and starts accumulating further data.

16. An image communicating apparatus according to claim 12, wherein, when the data accumulated in said third buffer means reaches a predetermined amount, said horizontal/vertical conversion means performs the horizontal/vertical conversion of the data in said third buffer means successively and transfers the converted data to said fourth buffer means.

17. An image communicating apparatus according to claim 12, wherein said recording means starts recording when the data accumulated in said fourth buffer means reaches a predetermined amount.

18. An image communicating apparatus according to claim 12, wherein said second control means includes:

range detecting means for detecting a range over which black data is present in the data accumulated in said fourth buffer means, storage means for storing data indicating the range over which black data is present, and counter means for counting signals issued depending on the position of said recording head, said second control means controlling the start or the end of recording by said recording means based on both a counted value of said counter means and said data in said storage means indicating the range over which black data is present.

19. An image communicating apparatus according to claim 18, wherein after the end of one recording scan of said recording head, said second control means selects, based on the end position of recording by the current recording scan and the range over which black data subject to next recording scan is present, one of opposite ends of said black data range which gives a shorter distance for movement of said recording head from said end position of recording by the current scan, as a printing start position for the next recording scan.

20. An image communicating apparatus according to claim 19, wherein, when there exists a line image extending over a plurality of recording scans, said second control means controls said recording means so that a next recording scan is performed in the same direction as a current recording scan regardless of the black data range subject to the next recording scan.

21. An image communicating apparatus according to claim 12, wherein said fourth buffer means has a storage capacity for data of at least two recording scans performed by said recording means.

22. An image communicating apparatus according to any one of claims 12 to 14 and 16 to 20, wherein said recording means records an image by ejecting ink droplets.

23. An image communicating apparatus according to claim 22, wherein said recording means ejects the ink droplets by causing a phase change of ink with thermal energy.

* * * * *

UNITED STATES PATENT AND TRADEMARK OFFICE
CERTIFICATE OF CORRECTION

PATENT NO.   : 6,111,656
DATED        : August 29, 2000
INVENTOR(S)  : Nohata et al.

Page 1 of 1

It is certified that error appears in the above-identified patent and that said Letters Patent is hereby corrected as shown below:

Column 1:
Line 23, "times," should read -- number of times, --.

Column 9:
Line 2, "of" should read -- of the fact --.

Column 14:
Line 14, "converting" should read -- converting means --.

Signed and Sealed this

Twenty-eighth Day of August, 2001

Attest:

*Nicholas P. Godici*

NICHOLAS P. GODICI
*Attesting Officer*   *Acting Director of the United States Patent and Trademark Office*